United States Patent [19]

Ogawa et al.

[11] 4,412,102
[45] * Oct. 25, 1983

[54] KEY TELEPHONE SYSTEM

[75] Inventors: Seiki Ogawa, Tokyo; Michio Mito; Tsuyoshi Shinoi, both of Kawasaki, all of Japan

[73] Assignees: Nippon Telegraph & Telephone, Tokyo; Nippon Tsushin Kogyo Kabushiki Kaisha, Kawasaki, both of Japan

[*] Notice: The portion of the term of this patent subsequent to Aug. 31, 1999, has been disclaimed.

[21] Appl. No.: 279,262

[22] Filed: Jul. 1, 1981

Related U.S. Application Data

[63] Continuation-in-part of Ser. No. 178,950, Aug. 18, 1980.

[30] Foreign Application Priority Data

Aug. 20, 1979 [JP] Japan .................. 54/104921
Aug. 20, 1979 [JP] Japan .................. 54/113353
Aug. 20, 1979 [JP] Japan .................. 54/113354

[51] Int. Cl.³ .................. H04M 9/06; H04Q 5/18
[52] U.S. Cl. .................. 179/99 M; 179/18 GF
[58] Field of Search .......... 179/99 M, 99 P, 18 FA, 179/18 GE, 18 GF, 81 B

[56] References Cited

U.S. PATENT DOCUMENTS 4,160,131 7/1979 Kaul et al. .................. 179/99 M
4,184,054 1/1980 Shibata et al. .................. 179/99 M
4,203,011 5/1980 Caviello .................. 179/99 P
4,236,049 11/1980 Tanihata et al. .................. 179/99 P Primary Examiner—Gerald L. Brigance
Attorney, Agent, or Firm—Burns, Doane, Swecker & Mathis

[57] ABSTRACT

A key telephone system comprises a plurality of key telephones and a main equipment connected to at least one set of central office (CO) lines and capable of connecting thereto the key telephones. The main equipment includes a dual tone multifrequency (DTMF) sending circuit common to the key telephones, and the respective key telephones are connected to the main equipment through four wiring cables capable of forming one both-way voice frequency talking circuit, two one-way voice frequency talking circuits and one both-way digital data transmitting circuit. A plurality of switching matrixes are included in the main equipment for selectively connecting the both-way voice frequency talking circuit or one-way voice frequency talking circuit to the CO lines, the two one-way voice frequency talking circuits to the both-way voice frequency talking circuit or to one of the one-way voice frequency talking circuits in the other key telephone and also connecting the digital data transmitting circuit through the DTMF sending circuit to the CO lines, whereby respective functions of originating and terminating CO line calls, hand-free talk-back and off-hook signalling for intercom call, speaker monitoring function during CO line talking and the like are performable.

6 Claims, 7 Drawing Figures

KEY TELEPHONE SYSTEM

BACKGROUND OF THE INVENTION

Cross-Reference to Related Applications

This application is a continuation-in-part of our earlier copending application Ser. No. 178,950 filed on Aug. 18, 1980.

FIELD OF THE INVENTION

This invention relates to key telephone systems and, more particularly, to a key telephone system capable of operating in such modes as hand-free talk-back, off-hook signaling and the like with a less number of wiring cables between a main equipment and respective key telephones.

What the present invention further relates to is, more specifically, a key telephone system wherein the number of wiring cables between the main equipment and each key telephone is reduced to four, with which one both-way voice frequency talking path, two one-way voice frequency talking paths, one both-way digital data transmitting path and one electric power supplying path from the main equipment to the respective key telephones are formed. The invention also pertains to a key telephone system wherein a plurality of key telephones are provided with a voice frequency talking circuit connected to the both-way voice frequency talking path, and other two one-way voice frequency talking circuits respectively connected to the two one-way voice frequency talking path, and the main equipment is provided with a plurality of key telephone interface circuits corresponding to each of the key telephones and connected to the one both-way voice frequency talking path, two one-way voice frequency talking paths and one both-way digital data transmitting path. The main equipment also includes a plurality of switching matrixes connecting the key telephone interface circuits to a plurality of interface circuits of central office lines (which shall be referred to as CO lines hereinafter), a plurality of intercom trunk circuits and audible signal source, and a further switching matrix connecting the CO line interface circuit to a plurality of circuits for sending dual-tone multifrequency signals (which shall be referred to as DTMF signals hereinafter) or the like. The invention further relates to a key telephone system wherein the DTMF signal generating circuit is eliminated from each of the plurality of key telephones and the dial digit signal of each key telephone is transmitted to the main equipment to be converted to a DTMF signal by using a DTMF signal of a DTMF sending circuit in the main equipment and then sent to the CO line (subscriber's line) through the CO line interface circuit.

DESCRIPTION OF PRIOR ART AND RELATION OF ADDITION

The present inventors have previously suggested an invention as disclosed in U.S. patent application, Ser. No. 178,950 filed on Aug. 18, 1980 under the title of "Key Telephone System", now U.S. Pat. No. 4,347,409, wherein the number of wiring cables between respective key telephones and a main equipment is six, a first both-way voice frequency talking path is formed by two of the wiring cables, a second both-way voice frequency talking path is formed by next two of the wiring cables, a both-way digital data transmitting path is formed by remaining two of the wiring cables, and two wiring cables functioning as the second both-way voice frequency talking path and those functioning as the both-way digital data transmitting path are utilized as phantom lines to form an electric power supplying path. According to this previous invention, such various functions as handset intercom and CO line calls, hand-free talk back for intercom call, speaker monitoring, off-hook signaling and tone signaling can be realized and improvements in the traffic density can be accomplished but, since the number of the wiring cables is six, easier wiring work, fabricating cost reduction and the like have been unable to be well attained.

A primary object of the present invention is, therefore, to provide a novel key telephone system wherein the number of wiring cables is reduced to four and such various functions as the handset intercom and CO line calls, hand-free intercom call, speaker monitoring, off-hook signaling and tone signaling are realized.

Another object of the present invention is to provide a novel key telephone system wherein a calling is made by a tone signal in response to an incoming call from another intercom or CO line during the time of off-hook so that the number of wiring cables between the main equipment and the key telephone can be reduced to be four and already provided conventional wiring cables can be utilized.

A further object of the present invention is to provide a novel key telephone system wherein the first and second wiring cables arranged between the main equipment and the key telephone are made to function as a both-way voice frequency talking path, one-way voice frequency talking path and a part of another one-way voice frequency talking path and the third and fourth wiring cables are made to function as a both-way digital data transmitting path, the said part of another one-way voice frequency talking path and an electric power feeding path so as to be able to maintain a high traffic density.

A still further object of the present invention is to provide a key telephone system wherein the both-way digital data transmitting paths are efficiently utilized so as to eliminate from the DTMF signal generating dial circuit of the key telephone the costly tone generating circuit.

Yet another object of the present invention is to provide a key telephone system provided with a plurality of switching matrixes selectively connecting a both-way voice talking path and two one-way voice talking paths and a further switching matrix connecting the CO interface circuit to such signal source as a DTMF sending circuit or the like so as to remarkably improve the respective functions of the key telephone still at low manufacturing costs.

SUMMARY OF THE INVENTION

In order to achieve the respective objects, the present invention suggests in its various aspects such arrangements of the key telephone system that:

The system comprises a reduced number of wiring cables arranged between a main equipment and a plurality of key telephones, a plurality of switching matrixes arranged within the main equipment so as to interconnect the wiring cables and a DTMF sending circuit arranged within the main equipment so as to send DTMF signals to the central office in response to a command from each key telephone.

In the key telephone system, the number of wiring cables between the main equipment and the respective key telephones is maintained to be four, a both-way voice frequency talking path, a one-way voice frequency talking path and a part of another one-way voice frequency talking path are formed of two of these wiring cables, while a both-way digital data transmitting path, the said part of another one-way voice frequency talking path and a power feeding path are formed of the other two of the four wiring cables.

In another arrangement of the key telephone system, further, the main equipment comprises (a) both-way and one-step switching matrix which a voice frequency circuit of a key telephone interface circuit in the main equipment connected to a voice frequency circuit in a key telephone through a both-way voice frequency talking path to any one of CO line interface circuits or any one of intercom trunk circuits changeably as required, (b) both-way and one-step switching matrix which connects, in connecting another key telephone to the said key telephone through an intercom talking path, the particular intercom trunk circuit to one of tone sources changeably as required, (c) one-step switching matrix which connects a voice frequency circuit of the key telephone interface circuit in the main equipment connected to a voice frequency circuit in the key telephone through a pair of one-way voice frequency talking paths to an intercom trunk circuit already seized by another voice frequency circuit of the key telephone interface circuit connected through a both-way voice frequency talking path, and (d) one-step switching matrix which, when the key telephone catches a CO line (subscriber's line) and sends DTMF signals to the central office through the main equipment, connects any one of DTMF sending circuits changeably as required to any one of the CO line interface circuits.

Further suggested is a key telephone system which comprises a plurality of key telephones and a main equipment, wherein (i) the key telephones respectively comprise a push button pad from which a DTMF signal generating circuit is eliminated, a controlling circuit which periodically scans respective contacts of push buttons in the pad through a scanning circuit, a storing circuit which stores such data as numerical values corresponding to the contacts closed by the push buttons depressed, and a data transmitting and receiving circuit which obtains stored contents of the storing circuit as digital data through the controlling circuit to send these data to the key telephone interface circuit of the main equipment and provides the digital data received from the key telephone interface circuit to the controlling circuit to light a proper indicating lamp, (ii) whereas the main equipment comprises a digital data transmitting and receiving circuit arranged in the key telephone interface circuit and connected to the digital data transmitting and receiving circuit of the key telephone, a main controlling section which transmits and receives digital data to and from the key telephone through the digital data transmitting and receiving circuit of the key telephone interface circuit so as to drive a plurality of switching matrixes in response to the digital data obtained from the key telephone, a storing circuit which stores the digital data received by the main controlling section, and a DTMF sending circuit which converts one digit part of the digital data stored in the storing circuit into DTMF signals and sends the converted signals to the CO line (subscriber's cable) through the switching matrixes.

In a further aspect of the key telephone system, first and second voice frequency circuits and one digital data transmitting and receiving circuit are arranged in each key telephone, the first voice frequency circuit is connected to the first voice frequency circuit of the key telephone interface circuit of the main equipment through two wiring cables, the digital data transmitting and receiving circuit is connected to the digital data transmitting and receiving circuit of the key telephone interface circuit through other two wiring cables and the second voice frequency circuit is connected to the second voice frequency circuit of the key telephone interface circuit through a one-way voice frequency path comprising the former two wiring cables and another one-way voice frequency path comprising the two wiring cables and the other two wiring cables, so as to form one both-way voice frequency talking path, two one-way voice frequency talking paths, one both-way digital data transmitting path and one power feeding path between the key telephone and the main equipment capable of performing ordinary CO line (subscriber cable) connection, intercom connection and tone connection, and also off-hook signalling to the key telephone during the handset talking so as to indicate an incoming call from the other key telephone or external telephone, so that the incoming call can be immediately responded to together with the utilization of the highly flexible switching matrixes.

In a still further aspect of the key telephone system, the DTMF sending circuit for each key telephone is eliminated, whereas a few DTMF sending circuits are commonly arranged only in the main equipment, a DTMF signal is sent to the CO line through a switching matrix from the DTMF sending circuit only when required and, therefore, the manufacturing costs are extremely low.

Yet further suggested is a key telephone system wherein the operating state of the push button pad of each key telephone is transmitted as digital data to the main controlling section of the main equipment and, therefore, a restriction of toll call connections of the key telephone and digital signal re-sending operation of the finally depressed push button can be realized by a very economical means.

BRIEF DESCRIPTION OF THE DRAWINGS

The present invention as well as its other objects and advantages shall be made more clear by reference to the following description detailed with reference to preferred embodiments as shown in accompanying drawings, in which.

Figure 1:
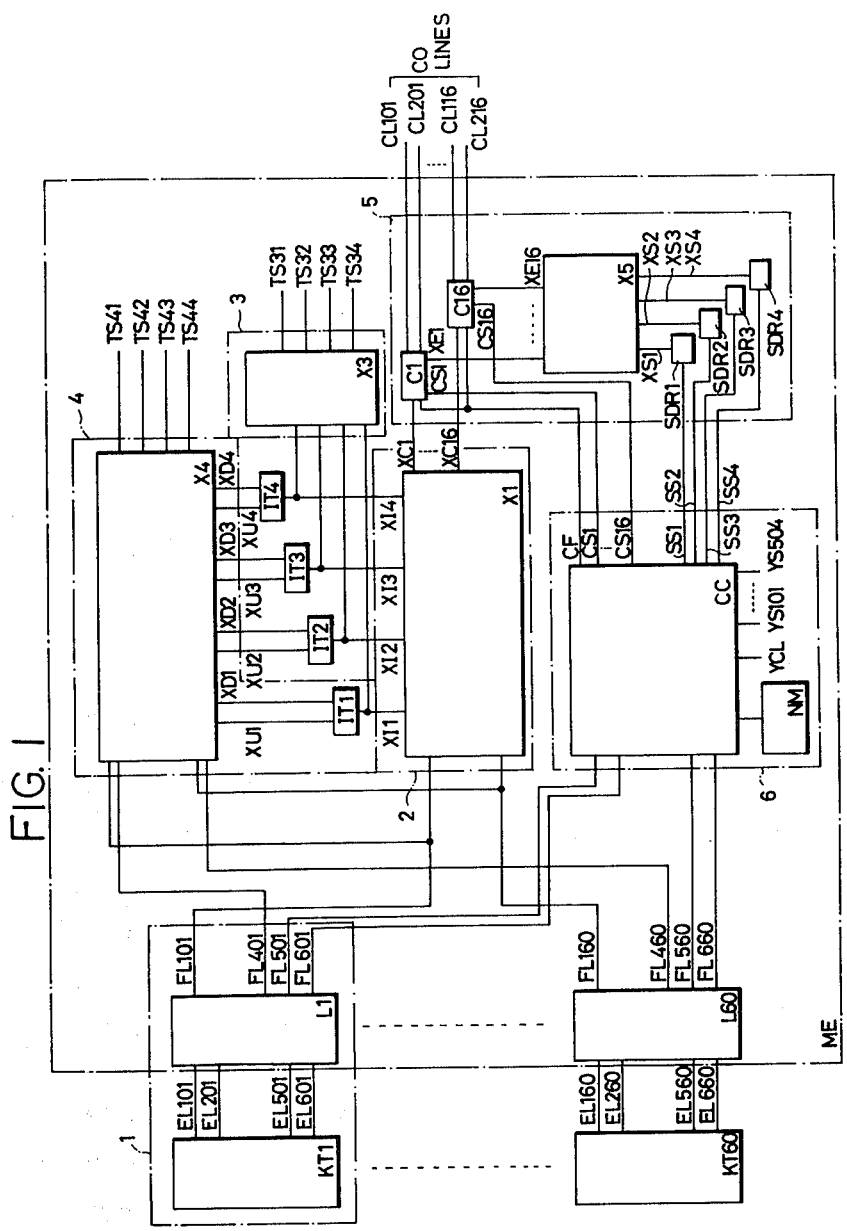
FIG. 1 is a block diagram of a key telephone system of the present invention provided with a main equipment ME connected to a CO line (subscriber's line) and key telephones KT1 to KT60 connected respectively to each of key telephone interface circuits L1 to L60 arranged in the main equipment ME.

While the invention shall now be explained hereinafter with reference to the embodiment shown in the drawings, the intention is not to limit the invention to the particular embodiment but is to rather include all possible modifications, alterations and equivalent arrangements within the scope of appended claims.

DESCRIPTION OF THE INVENTION

Referring now to FIG. 1, the main equipment ME of the key telephone system according to the present invention which is adapted, for example, to sixty key telephones denoted by KT1 to KT60 is provided with sixty key telephone interface circuits L1 to L60 which are respectively connected to each of the key telephones through four wiring cables EL101–EL601 to EL160–660. In only the drawing, the first key telephone interface circuit L1 and first key telephone KT1 connected with each other through the wiring cables EL101, EL201, EL501 and EL601 and the sixtieth key telephone interface circuit L60 and sixtieth key telephone KT60 connected with each other through the wiring cables EL160, EL260, EL560 and EL660 are illustrated to avoid a complication of the drawing. In connection thereto, wirings between the respective key telephone interface circuits L1 to L60 and the other circuits in the main equipment ME are also shown only by lead wires FL101, FL401, FL501 and FL601 between the first key telephone interface circuit L1 and the respective other circuits and lead wires FL160, FL460, FL560 and FL660 between the sixtieth key telephone interface circuit L60 and the respective other circuits, so as to avoid any further complication of the drawing. The first key telephone interface circuit L1 is connected through the lead wire FL101 to the switching matrixes X1 and X4, through the lead wire FL401 to the switching matrix X4, and through the lead wires FL501 and FL601 to the main controlling circuit CC.

Similarly, the sixtieth key telephone interface circuit L60 is connected through the lead wires FL160 to the switching matrixes X1 and X4, through the lead wire FL460 to the switching matrix X4 and through the lead wires FL560 and FL660 to the main controlling circuit CC. It will be clear that the other key telephone interface circuits L2 to L59 are respectively connected in the same manner as above. The switching matrix X1 is connected to the intercom trunk circuits IT1 to IT4 respectively through lead wires XI1 to XI4 and to the switching matrix X3 also through these lead wires XI1 to XI4. The switching matrix X4 is connected through lead wires TS41 to TS44 to the tone source (not shown), and to the intercom trunk circuits IT1 to IT4 respectively through four pairs of lead wires XU1 and XD1, XU2 and XD2, XU3 and XD3 and XU4 and XD4. The CO line interface circuits C1 to C16 connected to the switching matrixes X1 respectively through lead wires XC1 to XC16 are connected respectively to CO lines CL101 and CL201 to CL116 and CL216. The switching matrix X5 connected to the CO line interface circuits C1 to C16 respectively through lead wires XE1 to XE16 is connected to the DTMF sending circuits SDR1 to SDR4 respectively through lead wires XS1 to XS4. The main controlling circuit CC connected to the respective CO line interface circuits C1 to C16 through a lead wire CF and further lead wires CS1 to CS16 respectively is also connected to the DTMF sending circuits SDR1 to SDR4 through lead wires SS1 to SS4 and to the respective switching matrixes X1, X3 to X5. That is, the main controlling circuit CC is connected to the switching matrix X1 through lead wires YS101 to YS175, to the switching matrix X3 through a lead wire YS301, to the switching matrix X4 through lead wires YS401 to YS431 and to the switching matrix X5 through lead wires YS501 to YS504. Further, the numerical value memory circuit NM is connected to the main controlling circuit CC through a lead wire.

Figure 2:
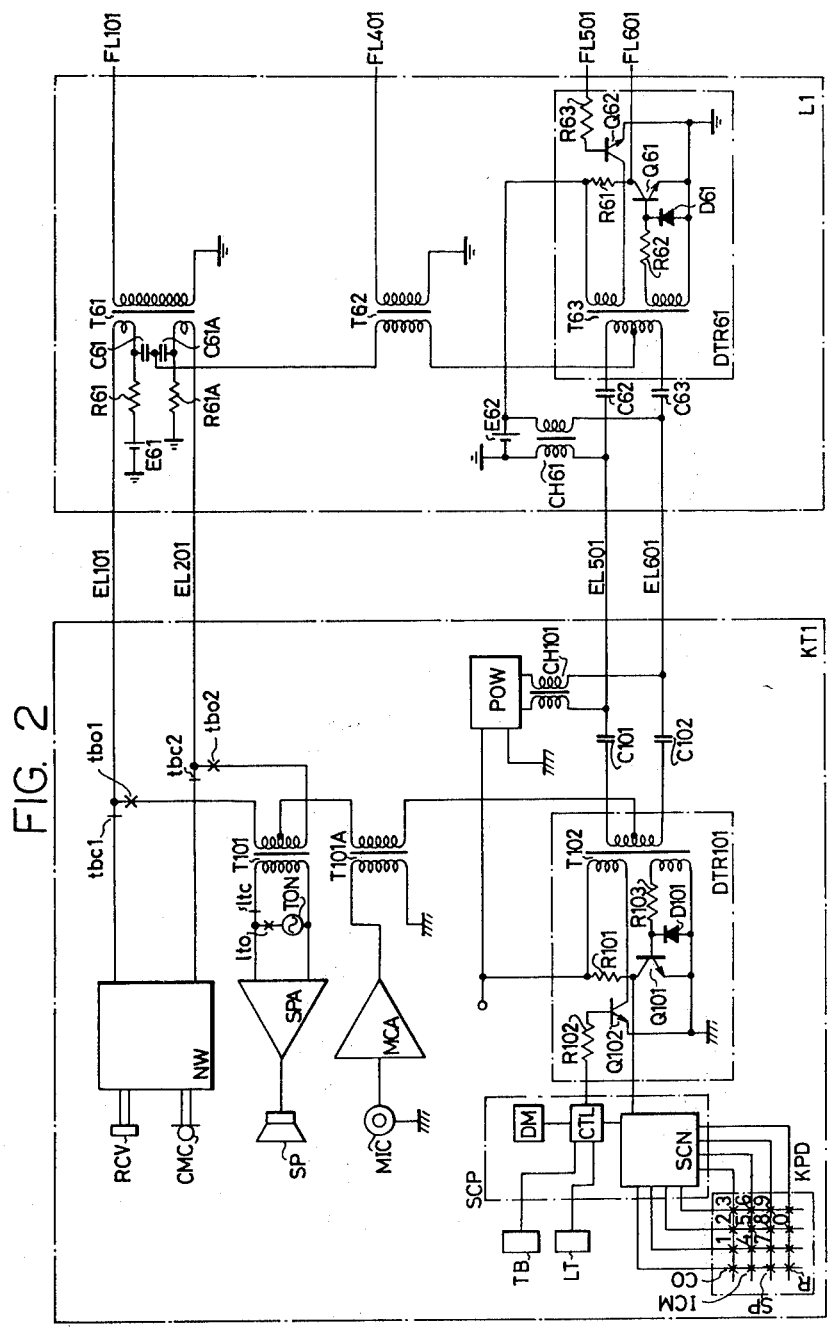
FIG. 2 shows a practical circuit arrangement of a part of the system encircled by a chain line 1 in FIG. 1, in particular, the key telephone KT1 and its corresponding key telephone interface circuit L1 in the main equipment ME, relatively in detail.

The key telephone system of the present invention shall now be explained in detail with reference to FIGS. 2 to 7. Referring to FIG. 2 showing more specifically, as an example, the first key telephone interface circuit L1 of the main device ME and key telephone KT1 connected with each other through the four wiring cables EL101, EL201, EL501 and EL601, transmitter CMC and receiver RCV of the handset of the key telephone KT1 are connected to a hybrid circuit NW which is connected to one end of each of a pair of primary windings of a transformer T61 in the key telephone interface circuit L1 through the wiring cables EL101 and EL201 which are thus forming one of a both-way voice frequency talking path. A series circuit of capacitors C61 and 61A is inserted between the other ends of the two primary windings of the transformer T61, and a series circuit of a resistance R61, a direct current source E61 grounded at the negative pole and a resistance R61A is parallelly connected to this series circuit of the capacitors C61 and 61A. The secondary winding of the transformer T61 is connected at one end to the switching matrix X1 through the lead wire FL101 and is grounded at the other end. A loud speaker SP of the key telephone KT1 is connected to the output end of a speaker amplifier SPA having a tone source TON inserted between the both input ends. The primary winding of the transformer T101 having the secondary winding connected at both ends respectively to the input terminal of the speaker amplifier is connected at both ends respectively to the wiring cables EL101 and EL201. The microphone MIC of the key telephone KT1 is grounded through the primary winding of the transformer T101A through a microphone amplifier MCA. The secondary winding of the transformer T101A is connected at one end to an intermediate tap of the primary winding of the transformer T101. The rows and columns forming the cross-points (such cross-points as 0 to 9, CO and ICM) of the push button pad KPD of the key telephone KT1 are connected to a scanning circuit SCN of a controlling processor SCP which is connected through a control circuit CTL to a dial memory circuit DM, while relays TB and LT are also connected to the controlling circuit CTL. The normally closed contacts tbc1 and tbc2 of the relay TB are inserted between the hybrid circuit NW and the wiring cables EL101 and EL201 and the normally opened contacts tbo1 and tbo2 are inserted between the wiring cables EL101 and EL201 and the primary winding of the transformer T101. The normally closed contact 1tc of the other relay LT is inserted between one end of the secondary winding of the transformer T101 and one input end of the speaker amplifier SPA, and the normally opened contact 1to is inserted between the tone source TON and one input end of the speaker amplifier SPA. One of the two primary winding of a transformer T102 in a data transmitting and receiving circuit DTR101 is connected at one end to a power source circuit POW and is grounded through a series circuit of a resistance R101 and transistor Q101, and the other end of this primary winding is also grounded through a transistor Q102 connected to the controlling circuit CTL of the controlling processor SCP throgh a resistance R102, while the other primary winding of the transformer T102 is connected at one end to the base of the transistor Q101 through a resistance R103, grounded at the other end and connected also at the other end to the base of the transistor Q101 through a normal directional diode D101. The secondary winding of the transformer T102 is connected at the intermediate tap to the other end of the secondary winding of the foregoing transformer T101A and at both ends to respective one ends of the wiring cables EL501 and EL601 respectively through each of capacitors C101 and C102. The wiring cable EL501 is connected to the power source circuit POW through one of the coils of a choke CH101 and the wiring cable EL601 is connected to the power source circuit POW through the other coil of the choke CH101. These wiring cables EL501 and EL601 are connected at the other ends to both ends of the primary winding of a transformer T63 of a data transmitting and receiving circuit DTR61 of an interface circuit L1 of the key telephone respectively through capacitors C62 and C63. One of two secondary winding of the transformer T63 is connected at one end to the positive pole of a direct current power source E62 grounded at the negative pole, while also grounded through a series circuit of a resistance R61 and transistor Q61, and is grounded at the other end through a transistor Q62. The other secondary winding of this transformer T63 is connected at one end to the base of the transistor Q61 through a resistance R62 and is grounded at the other end which is also connected to the base of the transistor Q61 through a normal directional diode D61. Junction point between the transistor Q61 and the resistance R61 is connected to the lead wire FL601, whereas the base of the transistor Q62 is connected to the lead wire FL501 through a resistance R63. The positive and negative poles of the current power source E62 are connected respectively to the other ends of the wiring cables EL501 and EL601 through different coils of the choke CH61. The primary winding of a transformer T62 having the secondary winding connected at one end to the lead wire FL401 and grounded at the other end is connected at one end to the junction of the capacitors C61 and C61A and at the other end to an intermediate tap of the primary winding of the transformer T63.

Figure 3:
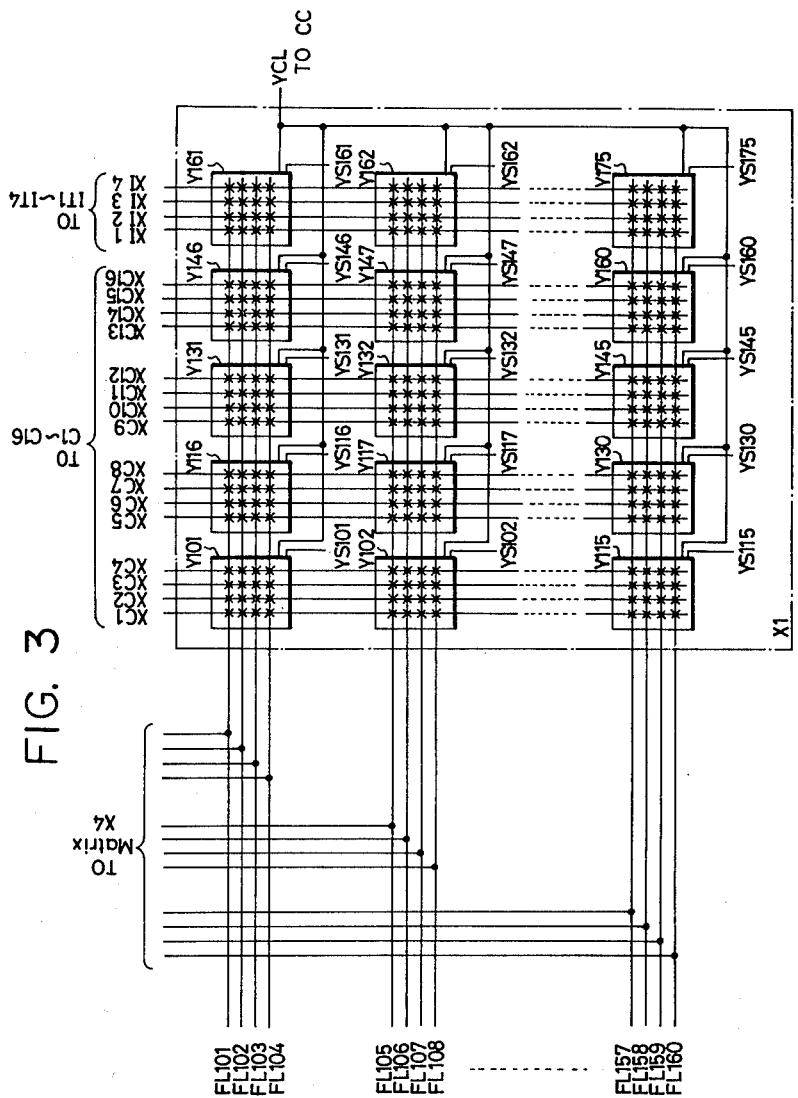
FIG. 3 shows a practical circuit arrangement of a part of the system encircled by a chain line 2 in FIG. 1, in particular, switching matrixes X1 connected to the respective key telephone interface circuits L1 to L60, to the CO lines through respective CO line interface circuit C1 to C16 and further to respective intercom trunk circuits IT1 to IT4.

As shown in FIG. 3, the switching matrix X1 comprises 75 pieces of cross-point switches Y101 to Y175 each of which is of 4 columns and 4 rows. Referring to their wirings with a representation i=01 to 15, the respective rows in each of the respective groups of the cross-point switches Y1i, Y1(i+15), Y1(i+30), Y1-(i+45) and Y1(i+60) are connected to each of the lead wires FL(4i−3), FL1(4i−2), FL1(4i−1) and FL1(4i), whereas the respective columns in each of the respective groups of the cross-point switches Y101 to Y115, Y116 to Y130, Y131 to Y145, Y146 to Y160 and Y161 to Y175 are connected respectively to each of the lead wires XC1 to XC4, XC5 to XC8, XC9 to XC12, XC13 to XC16 and XI1 to XI4. All of the cross-point switches Y101 to Y175 are connected to the lead wires YCL and to the respective lead wires YS101 to YS175.

Figure 4:
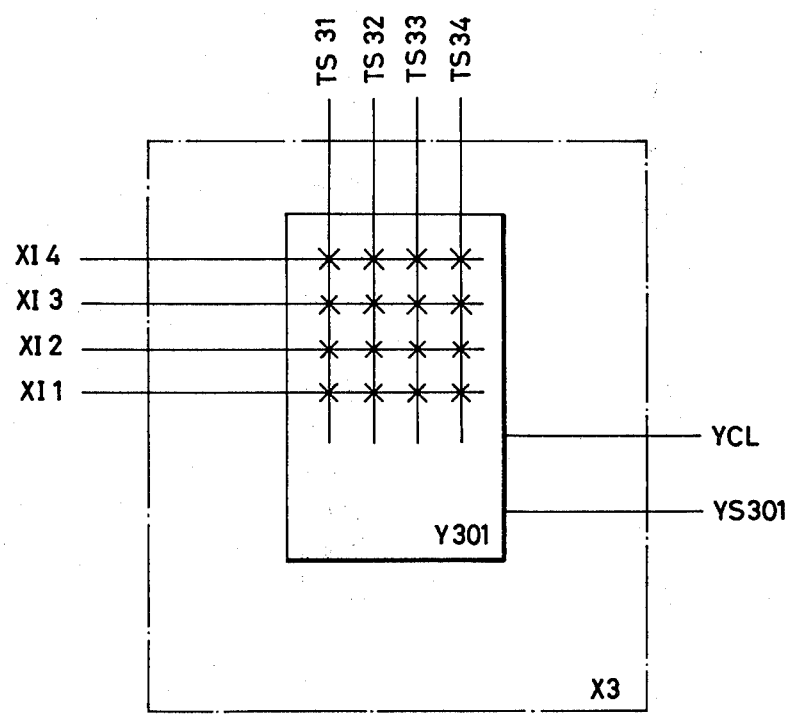
FIG. 4 shows a practical circuit arrangement of a part of the system encircled in a chain line 3 in FIG. 1, specifically a switching matrix X3 connected to the switching matrix X1 of FIG. 3 and to respective tone sources, that is, audible signal generating sources TS1 to TS4 (not shown)

Referring next to FIG. 4 showing the switching matrix X3, its cross-point switch Y301 in 4 rows and 4 columns is connected at the rows to the lead wires XI1 to XI4 and at the columns to the lead wires TS31 to TS34. The cross-point switch Y301 is further connected to the lead wires YCL and YS301.

Figure 5:
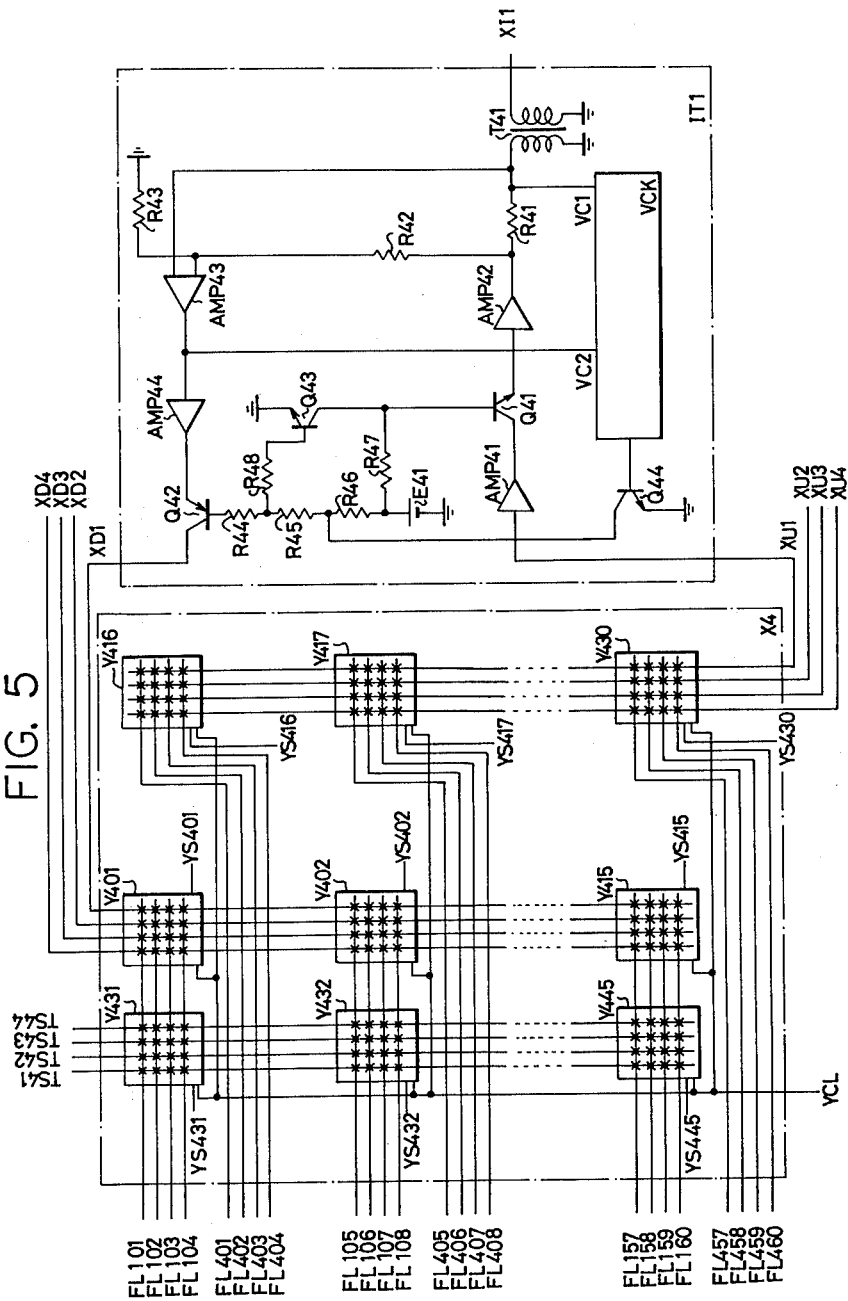
FIG. 5 shows a practical circuit arrangement of a part of the system encircled in a chain line 4 in FIG. 1, in particular, switching matrix X4 connected to the key telephone interface circuits L1 to L60 and tone sources TS1 to TS4, and the intercom trunk circuits IT1 to TS4 to which the matrix X4 is also connected, while only one circuit IT1 is shown since others IT2 to IT4 are of the same arrangement.

As shown in FIG. 5, the switching matrixes X4 comprise 45 cross-point switches Y401 to Y445 respectively of 4 rows and 4 columns. The rows of the cross-point switches Y4i and Y4(i+30) are connected respectively to the lead wires FL1(4i−3), FL1(4i−2), FL1(4i−1) and FL1(4i) wherein i=01 to 15, while the columns of the cross-point switches Y401 to Y415 are connected to the lead wires XD1 to XD4 and the columns of the cross-point switches Y431 to Y445 are connected to the lead wires TS41 to TS44. Further cross-point switches Y4(i+15) are connected at their rows respectively to each of the lead wires FL4(4i−3), FL4(4i−2), FL4(4i−1) and FL4(4i) and at their columns respectively to each of the lead wires XU1 to XU4. The cross-point switches Y401 to Y445 are further connected to the lead wire YCL and respectively to the lead wires YS401 to YS445.

An amplifier AMP41 which is a component element of the intercom trunk circuit IT1 is connected at the input end to the lead wire XU1 acting as a one-way talking path and at the output end through a series circuit of a transistor Q41, amplifier AMP42 and resistance R41 to the other end of the primary winding grounded at one end of a transformer T41. The secondary winding of this transformer T41 is connected to the lead wire XI1 grounded at one end and acting at the other end as a both-way talking path. An amplifier AMP43 is connected at an inverted input end to the said one end of the primary winding of the transformer 41 and at a non-inverted input end to the output end of the amplifier AMP42 through a resistance R42, and this non-inverted input end is grounded through a resistance R43. Further, the amplifier AMP43 is connected at the output end to the lead wire XD1 through an amplifier AMP44 and transistor Q42, the base of the latter of which is grounded through resistances R44 to R46 and a direct current source E41. A transistor Q43 grounds the base of the transistor Q41 which is also grounded through a series circuit of a resistance R47 and the direct current source E41 and is connected at the base of the junction of the resistances R44 and R45 through a resistance R48. A further transistor Q44 grounds the junction of the resistances R45 and R46. A controlling circuit VCK connected at the output end to the base of the transistor Q44 is connected at one input end to the said one end of the primary winding of the transformer T41 through a lead wire VC1 and at the other input end to the output end of the amplifier AMP43 through a lead wire VC2. While not shown in the drawing, other intercom trunk circuits IT2 to IT4 are also formed in the same manner as the intercom trunk circuit IT1.

Figure 6:
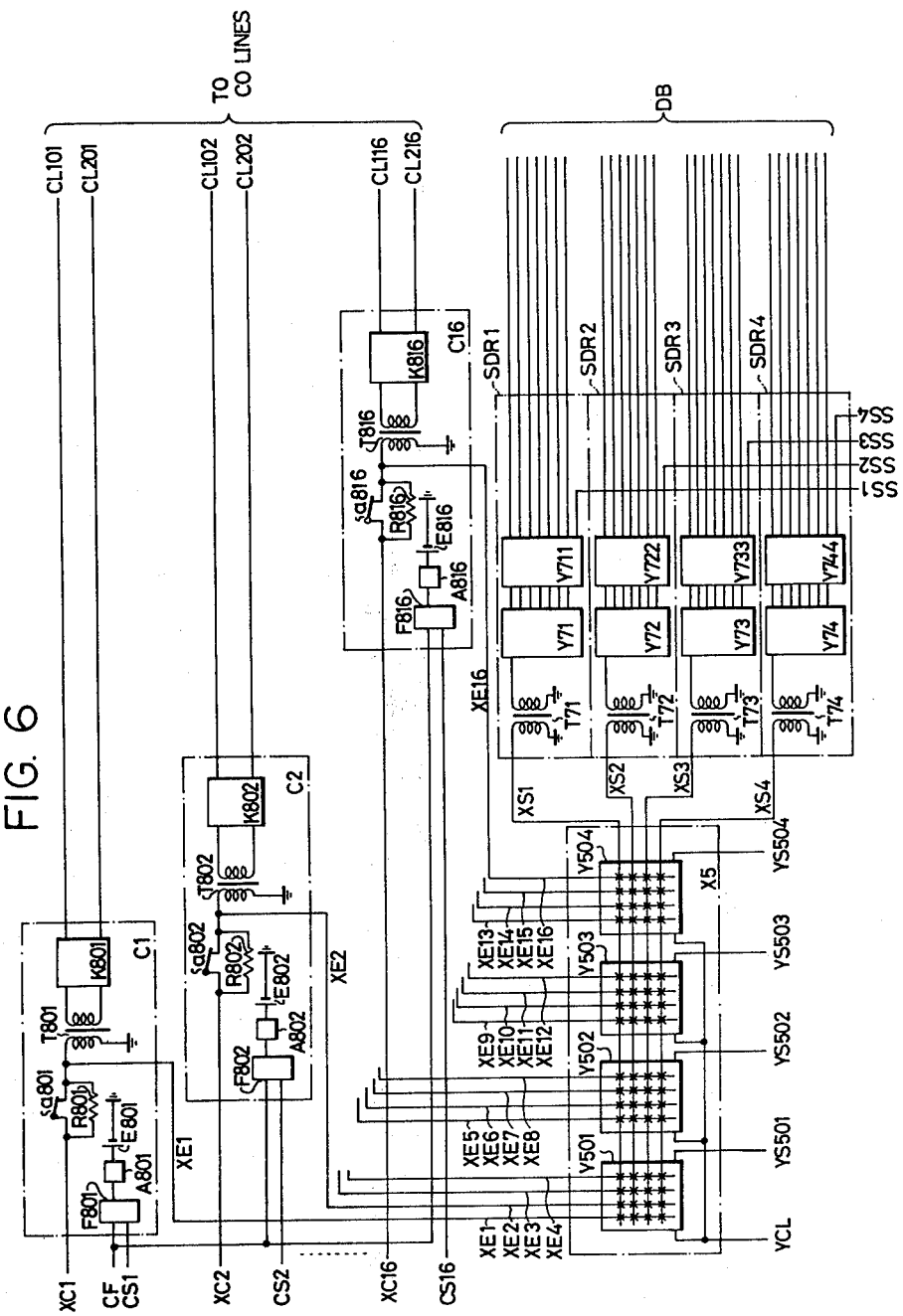
FIG. 6 is a practical circuit arrangement of a part shown by a chain line 5 in FIG. 1, specifically of the CO line interface circuits C1 to C16, switching matrix X5 connected to these interface circuits C1 to C16 and DTMF sending circuits SDR1 to SDR4 connected to the matrix X5.

Referring next to FIG. 6, the switching matrix X5 comprises four cross-point switches Y501 to Y504 which are respectively of 4 rows and 4 columns. The rows of all of these cross-point switches Y501 to Y504 are connected to the lead wires XS1 to XS4 whereas, with a representation i=01 to 04 the columns of these respective cross-point switches Y5i are connected respectively to each of the lead wires XE(4i−3), XE(-4i−2), XE(4i−1) and XE4i. In the respective CO line interface circuits Cj, with a representation j=01 to 16, the primary winding of a transformer T8j is grounded at one end and connected at the other end to the lead wire XEj. This transformer T8j is connected at said other end also to the lead wire XCj through a parallel circuit of a relay contact a8j and resistance R8j, a relay A8j which opens and closes the relay contact a8j is grounded at one end through a direct current source E8j and connected at the other end to the output end of a flip-flop F8j which is connected at the respective input ends to the lead wires CF and CSj, and a functional circuit K8j connected to the secondary winding of the transformer T8j is connected to the CO lines CL1j and CL2j. In the DTMF sending circuits SDRi- (i=1 to 4), the primary winding of a transformer T7i is grounded at one end and connected at the other end to the lead wire XSi, and the secondary winding of the transformer T7i is grounded at one end and connected at the other end to the output end of a DTMF signal oscillating circuit Y7i which provides DTMF signals consisting of two tones. This DTMF signal oscillating circuit Y7i is connected to a one-digit memory circuit Y7ii which is connected to the lead wire SSi and further to data bus lines DB.

Figure 7:
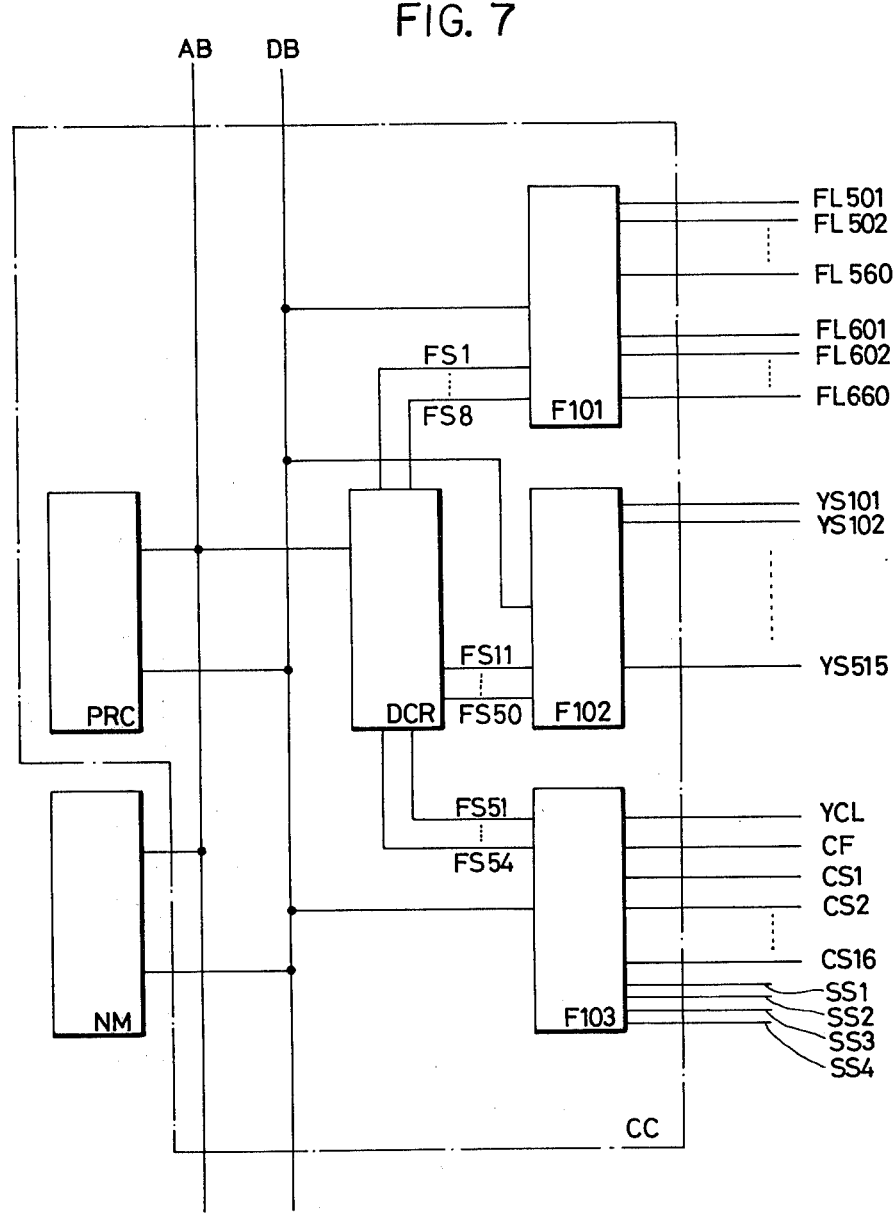
FIG. 7 is a practical circuit arrangement of a part shown by a chain line 6 in FIG. 1, specifically of a main controlling circuit CC connected to the respective key telephone interface circuits L1 to L60, switching matrixes X1, X3 to X5, CO line interface circuits C1 to C16 and DTMF sending circuits SDR1 to SDR4, and a numerical value memory circuit NM connected to the main controlling circuit CC.

Referring now to FIG. 7, the main controlling circuit CC includes a processor PRC which is connected to address bus lines AB and also to the data bus lines DB, to the former of which an address decoder DCR is connected, while this decoder is connected to the lead wires FS1 to FS54. A first flip-flop group F101 connected to the data bus lines DB is also connected to the lead wires FS1 to FS8 and to the lead wires FL501 to FL560 and FL601 to FL660. A second flip-flop group F102 connected to the data bus lines DB is also connected to the lead wires FS11 to FS50 and to the lead wires YS101 to YS515. A third flip-flop group F103 connected to the data bus lines DB is also connected to the lead wires FS51 to FS54 and to the lead wires YCL, CF, CS1 to CS16 and SS1 to SS4. The numerical value memory circuit NM is connected to the both address and data bus lines AB and DB so as to operate as a means for temporarily storing the data in the processor PRC. While the main controlling device CC is further provided with a program storing the circuit for storing controlling program of the processor PRC and a timer circuit setting the time of the processor PRC, they are not directly related to the present invention and references thereto are omitted here.

The respective functions of the key telephone system of the present invention shall be described in detail hereinafter.

INTERCOM CALLING WITH HANDSET

Reference shall be made to an intercom calling from the key telephone KT1 to the key telephone KT60, as an example.

When the handset of the key telephone KT1 is lifted to achieve the off-hook state (not shown), the controlling circuit CTL of the controlling processer SCP will begin to scan at a fixed period the opening and closing of the respective cross-points in the push button pad KPD through the scanning circuit SCN (see FIG. 2). The intercom talking button ICM of the push button pad KPD is pressed and an intercom calling signal is temporarily stored in the dial memory circuit DM through the scanning circuit SCN and controlling circuit CTL.

In the main equipment ME, the processor PRC drives the flip-flops in the first flip-flop group F101 through the address decoder DCR to deliver a seizure signal onto the lead wire FL501. In response to this signal, the transistor Q62 in the data transmitting and receiving circuit DTR61 of the key telephone interface circuit L1 is conductive and seizure pulses are provided to the wiring cables EL501 and EL601 through the transformer T63. The seizure pulses are then provided to the base of the transistor Q101 through the transformer T102 arranged in the digital data transmitting and receiving circuit DTR101 in the key telephone KT1, whereby the transistor Q101 is conductive to transmit the seizure pulses to the scanning circuit SCN of the controlling processer SCP, and the intercom calling signal temporarily stored in the dial memory circuit DM is thereby provided out through the controlling circuit CTL. In response to the thus provided intercom calling signal, the transistor Q102 in the data transmitting and receiving circuit DTR101 is conductive to deliver the requiring signal to the wiring cables EL501 and EL601, through which the calling signal is conveyed to the data transmitting and receiving circuit DTR61 of the key telephone interface circuit L1 in the main equipment ME, wherein the signal is fed to the base of the transistor Q61 through the transformer 63 to conduct the transistor Q61 and the intercom calling signal is provided to the further lead wire FL601.

In the main equipment ME, the flip-flops in the first flip-flop group F101 of the main controlling circuit CC receive the intercom calling signal through the lead wire FL601, and the signal is provided through the data bus lines DB to the processor PRC, so that the intercom calling signal made at the key telephone KT1 will be detected by the processer PRC and a proper signal will be sent from the processer PRC to the respective flip-flop groups F102 and F103 through the address decoder DCR. Cross-point switch selecting signals for selecting the cross-point switches Y161 and Y301 in the matrixes X1 and X3 are provided respectively to the lead wires YS161 and YS301 by the flip-flops in the flip-flop group F102, and a cross-point switch driving signal for driving all of the cross-point switches in the matrixes X1 and X3 is provided to the lead wire YCL by the flip-flops in the flip-flop group F103, whereby there is formed a series circuit of the receiver RCV of the handset of the key telephone KT1—hybrid circuit NW—normally closed contacts tbc1 and tbc2 of the relay TB—wiring cables EL101 and EL201—transformer T61 in the key telephone interface circuit L1 of the main equipment ME—lead wire FL101—rows of the cross-point switch Y161 in the switching matrix X1—columns of the cross-point switch Y161—lead wire XI1—rows of the cross-point switch Y301 in the switching matrix X3—columns of the cross-point switch Y301—lead wire TS31—tone source. The output signal of the tone source, that is, the dial tone is then transmitted to the receiver RCV of the handset of the key telephone KT1.

After the dial tone is heard, the push buttons "6" and "0" of the push button pad KPD are pressed in turn for the number "60" of the now required key telephone KT60 to require the formation of the intercom talking path. Upon the depressions of the push buttons "6" and "0", the number "60" is provided to the main controlling device CC in the main equipment ME in the same manner as in the foregoing. In the main controlling device CC, the processor PRC detects that the key telephone being called for by the intercom calling is the one numbered KT60 and provides a proper signal to the flip-flop groups F101, F102 and F103 through the address decoder DCR. An intercom calling signal is provided to the lead wire FL560 by the flip-flops of the flip-flop group F101. In response to the signal, the transistor Q62 of the data transmitting and receiving circuit DTR61 of the interface circuit L60 is conductive and starting pulses are provided to the wiring cables EL501 and EL601 through the transformer T63. The intercom calling signal is given to the base of the transistor Q101 through the transformer T102 arranged in the data transmitting and receiving circuit DTR101 of the key telephone KT60. The transistor Q101 will conduct and provide the intercom calling signal to the controlling circuit CTL through the scanning circuit SCN of the controlling processor SCP. The controlling circuit CTL drives the relay TB to open the normally closed contacts tbc1 and tbc2 and to close the normally opened contacts tbo1 and tbo2. Cross-point switch selecting signals for selecting the cross-point switches Y161, Y175 and Y301 are then provided respectively to the lead wires YS161, YS175 and YS301 by the flip-flops of the flip-flop group F102 and a cross point switch driving signal for driving all of the cross-point switches is provided to the lead wire YCL by the flip-flops of the flip-flop group F103, whereby there is formed a circuit of the receiver RCV of the handset of the key telephone KT1—hybrid circuit NW—normally closed contacts tbc1 and tbc2 of the relay TB—wiring cables EL101 and EL201—transformer T61 of the key telephone interface circuit L1 in the main equipment ME—lead wire FL101—rows of the cross-point switch Y161 in the switching matrixes X1—columns of the cross-point switch Y161 lead wire XI1—rows of the cross-point switch Y301 of the switching matrix X3—columns of the cross-point switch Y301—lead wire TS34—tone source; and columns of the cross-point switch Y175 in the switching matrixes X1—rows of the cross-point switch Y175—lead wire FL160—transformer T61 (not shown) of the key telephone interface circuit L60—wiring cables EL160 and El260—normally opened contacts tbo1 and tbo2 of the relay TB—transformer T101—normally closed contacts 1tc of the relay LT—speaker amplifier SPA—speaker SP of the key telephone KT60.

An output signal of the tone source is provided as an incoming call signal to the key telephone KT60 and also as a ring-back signal to the key telephone KT1. When, in response to a calling tone from the speaker SP corresponding to the incoming call signal, the handset of the key telephone KT60 is lifted to achieve its off-hook, the controlling processor SCP operates the relay TB and the wiring cables EL160 and EL260 are connected respectively to a receiver RCV and transmitter CMC of the key telephone KT60 through the hybrid circuit NW. Also in the key telephone KT60, further, the same as in the case of the key telephone KT1, the opening and closing state of the cross-points of the push button pad KPD is scanned by the control processor SCP and, responsive to the starting pulses from the main equipment ME, the scanned results are sent to the main control device CC. In this case, the scanned results show that all the cross-points in the push button pad of the telephone KT60 are open, that is, the handset of the key telephone KT60 is lifted solely in response to the calling tone. Therefore, the processor PRC of the main controlling device CC removes the cross-point switch selecting signal provided to the lead wire YS301 through the address decoder DCR and the flip-flops of the flip-flop group F102. Accordingly, the cross-point switch Y301 of the switching matrix X3 is opened so that, between the key telephones KT1 and KT60, there will be formed a circuit of the receiver RCV and transmitter CMC of the handset of the key telephone KT1—its hybrid circuit NW—normally closed contacts tbc1 and tbc2 of the relay TB—wiring cables EL101 and EL201—transformer T61 of the key telephone interface circuit L1 of the main equipment ME—lead wire FL101—rows of the cross-point switch Y161 in the switching matrixes X1—columns of the cross-point switch Y161—lead wire XI1—columns of the cross-point switch Y175—rows of the cross-point switch Y175—lead wire FL160—transformer T661 of the key telephone interface circuit L60—wiring cables EL160 and EL260—normally closed contacts tbc1 and tbc2 of the relay TB—hybrid circuit NW of the key telephone KT60—receiver and transmitter of the handset of the key telephone KT60. As a result, between the both key telephones KT1 and KT60, an inter-extension call can be made by using their respective handsets.

After the intercom calling between the key telephones KT1 and KT60 ends, the handsets of the key telephones KT1 and KT60 are returned to the initial positions, then the control circuit CTL of the controlling processor SCP stops the operation so that the signals sent in response to the starting pulses from the main equipment ME are all removed. Consequently, various signals from the flip-flops of the flip-flop groups F102 and F103 of the main controlling device CC of the main equipment ME are removed and the key telephone system of the present invention are returned to the initial state.

INTERCOM CALLING WITHOUT HANDSET

Reference shall be made next to an intercom calling from the key telephone KT1 to the key telephone KT60 made without using the handset.

The handset of the key telephone KT1 is lifted and the intercom calling button ICM of the push button pad KPD is pressed, then the dial tone is heard by the receiver RCV of the handset in the same manner as described above, thereafter the push buttons "6" and "0" are pressed in turn for the number "60" of the key telephone KT60, and additionally the button "0" is pressed again, whereby button depression signals of "6", "0" and "0" are provided to the main controlling device CC of the main equipment ME for the key telephone KT1 in the same manner as described above and these signals are transmitted to the processer PRC through the flip-flop group F101 and data bus lines DB. In the processer PRC, it is detected that there is "0" in the third of the depression signals. In response to this detection, the same as described above, proper signals are given to the flip-flop groups F101, F102 and F103 through the address decoder DCR. In response to the intercom calling signals provided out of the flip-flops of the flip-flop group F101 to the lead wire FL560, the relay TB of the key telephone KT60 is operated in the same manner as above and its normally opened contacts tbo1 and tbo2 are closed. Also from the flip-flops of the flip-flop groups F102 and F103, cross-point switch selecting signals respectively for selecting the cross-point switch Y161 in the switching matrix X1 and for selecting the cross-point switches Y415 and Y430 in the switching matrixes X4 are provided, in the same manner as in the foregoing, respectively to the lead wires YS161, YS415 and YS430 through the address decoder DCR and flip-flop groups F102 and F103, and a cross-point switch driving signal for driving all of the cross-point switches is provided to the lead wire YCL, whereby there is formed a circuit of the transmitter CMC and receiver RCV of the handset of the key telephone KT1—its hybrid circuit NW—normally closed contacts tbc1 and tbc2 of the relay TB—wiring cables EL101 and EL201—transformer T61 of the key telephone interface circuit L1 of the main equipment ME—lead wire FL101—rows of the cross-point switch Y161 in the switching matrixes X1—columns of the cross-point switch Y161—lead wire XI1—inter-com trunk circuit IT1

```
 ┌─lead wire XD1 - column of the cross-point switch Y415
 │  in the switching matrix X4 - rows of the cross-point
 │  switch Y415 - lead wire FL160 - transformer T61 of the
 │  key telephone interface circuit L60 - wiring cables EL160
 │  and EL260 - normally opened contacts tbo1 and tbo2 of the
 │  relay TB - transformer T101 - normally closed contact 1tc
 │  of the relay LT - speaker amplifier SPA - speaker SP of
 │  the key telephone KT60.
 └──────lead wire XU1 - column of cross-point switch Y430
         in the switching matrixes X4 - rows of the
         cross-point switch Y430 - lead wire FL460 -
         transformer T62 of the key telephone interface
         circuit L60 ┬─transformer T61 - wiring cables
                     │  EL160 and EL260 - normally
                     │  opened contacts tbo1 and tbo2
                     │  of the relay TB -
                     │  transformer T101
                     └─transformer T63 - wiring cables
                        EL560 and EL660 - transformer T102 ─ transformer
                        T101A - microphone amplifier MCA - microphone
                        MIC of the key telephone KT60.
```

Finally, the call using the handset from the key telephone KT1 can be responded to without using the handset at the key telephone KT60. After the intercom call talking between the key telephones KT1 and KT60 ends, the handset of the key telephone KT1 is returned to the initial position, then the control circuit CTL of the controlling processer SCP stops the operation so that the signals sent in response to the starting pulses from the main equipment ME are all removed. Consequently, various signals from the flip-flops of the flip-flop groups F101, F102 and F103 of the main controlling device CC of the main equipment are removed and the key telephone system of the present invention are returned to the initial state.

OFF-HOOK SIGNALLING OF THE KEY TELEPHONE DURING INTERCOM CALL

Off-hook signalling to the key telephone KT60 from the key telephone KT1 during the intercom call with the handset with the key telephone KT50 shall be explained.

As will be clear from the foregoing, there is formed between the key telephones KT50 and KT60 a handset intercom call path of, briefly showing, the handset receiver RCV and transmitter CMC of the key telephone KT50—hybrid circuit NW—normally closed contacts tbc1 and tbc2 of the relay TB—wiring cables EL150 and EL250—interface circuit L50—lead wire FL150—switching matrix X1—lead wire X14—switching matrix X1—lead wire FL160—interface circuit L60—wiring cables EL160 and EL260—normally closed contacts tbc1 and tbc2 of the relay TB—hybrid circuit NW—handset receiver RCV and transmitter CMC of the key telephone KT60.

Now, if the handset of the key telephone KT1 is lifted and the intercom call button ICM and push buttons "6" and "0" are pressed in turn, the same as is described above, the flip-flop groups F101,F102 and F103 of the main controlling device CC are driven as in the foregoing and a signal showing that an intercom calling signal has arrived is sent out to the lead wire FL560 by the flip-flops of the flip-flop group F101. In the same manner as described above, this signal is transmitted to the control circuit CTL of the key telephone KT60 and, as the handset talk is being performed, the relay LT is thereby operated. With the operation of the relay LT, the normally opened contact 1to is closed and the output of the tone source TON is provided to the speaker SP through the speaker amplifier SPA, whereby it can be made known that the intercom calling signal is received by the key telephone KT60.

In the key telephone KT60, a depression of the signal receiving button R of the key pad KPD causes the intercom call to the key telephone KT50 to be reserved by the main controlling device CC of the main equipment ME and the intercom call from the key telephone KT1 can be responded to. If, in the key telephone KT60, the signal receiving button R of the key pad KPD is pressed again, the intercom call to the key telephone KT1 is reserved by the main controlling device CC of the main equipment ME and the intercom call to the key telephone KT50 can be continued. After the intercom call to the key telephone KT50 ends, the signal receiving button R of the key pad KPD is pressed in the key telephone KT60, the intercom call with the key telephone KT1 which has been reserved can be performed.

As will clear from the foregoing, the inter-com talking may be treated in the order of the call treatment, and the present invention can contribute to the acceleration of the work as a whole.

ORIGINATING CALLS TO CO LINES

Reference to the case of originating a call to a CO line (subscriber's line) from the key telephone KT1 shall be made next.

When the handset of the key telephone KT1 is lifted to achieve the off-hook and the push button "CO" representing an intention of the external line call requirement to the CO lines as well as the numerically numbered push buttons of, for example, "0" and "1" for selecting one CO line from CO lines 1 to 16 are depressed, the respective corresponding signals are sequentially stored in the dial memory circuit DM of the controlling processor SCP in the same manner as has been described. In response to the arrival of the seizure pulses from the main controlling device CC of the main equipment ME in the same manner as has been described, these stored signals are sequentially provided to the processor PRC through the flip-flop group F101. The processer PRC detects the external line call requirement to the CO line 1 and provides a cross-point switch selecting signal for selecting the cross-point switch Y101 in the switching matrix X1 to the lead wire YS101 through the address decoder DCR and flip-flop groups F102 and F103 and a cross-point switch driving signal for driving all of the cross-point switches to the lead wire YCL, whereby there is formed a CO line call circuit of the transmitter CMC and receiver RCV of the handset of the key telephone KT1—its hybrid circuit NW—normally closed contacts tbc1 and tbc2 of the relay TB—wiring cables EL101 and EL201—transformer T61 of the key telephone interface circuit L1 of the main equipment ME—lead wire FL101—rows of the cross-point switch Y101 in the switching matrix X1—columns of the cross-point switch Y101—lead wire XC1—CO line interface circuit C1—CO lines CL101 and CL201. Upon completion of this CO line call circuit, a dial tone from the central office (CO) can be heard at the key telephone KT1. After the dial tone is heard, the push buttons of the key telephone KT1 are depressed sequentially according to such a required number for calling the other subscriber as, for example, "2", "3", "4", "5", "6", "7" and "8", the number thus depressed is stored sequentially in the dial memory circuit DM of the controlling processor SCP. The number of digits or signs which the dial memory circuit DM can store is 16 at most, but there is a possibility that, in the course of the read-in of the digits or signs, seizure pulses reach the controlling processor SCP through the key telephone interface circuit L1 from the main controlling circuit CC of the main equipment ME. Even in such case, the read-in and read-out of the dial memory circuit DM are made by the "First-In First-Out" system so that the stored contents in the dial memory circuit DM will be transmitted in turn to the main controlling circuit CC of the main equipment ME in the same manner as has been described above without any error. In the main controlling circuit CC, the stored contents having reached the flip-flop group F10 are stored in the numerical value memory circuit NM also of the "First-In First-Out" system through the data bus lines DB. The processor PRC of the main controlling circuit CC transmits one digit of the stored contents in the numerical value memory circuit NM to, for example, the DTMF sending circuit SDR1 which is idle in all of the DTMF sending circuits SDR1 to SDR4. More specifically, the processor PRC sends a memory command signal to the lead wire SS1 through the address decoder DCR and flip-flop group F103 to have the said one digit stored in the one digit memory circuit Y711. On the other hand, the processor PRC sends a cross-point switch selecting signal for selecting the cross-point switch Y501 in the switching matrixes X5 and a flip-flop selecting signal for selecting the flip-flop F801 of the CO line interface circuit C1 respectively to the lead wires YS501 and CS1 through the address decoder DCR and flip-flop groups F102 and F103, as well as a cross-point switch driving signal and flip-flop driving signal respectively to the lead wires YCL and CF, whereby the relay A801 of the CO line interface circuit C1 is operated to open the relay contact a801, and there is formed a circuit of the one digit memory circuit Y711 of the DTMF sending circuit SDR1—DTMF signal oscillating circuit Y71—transformer T71—lead wire XS1—rows of the cross-point switch Y501 in the switching matrix X5—columns of the cross-point switch Y501—lead wire XE1—transformer T801 of the CO line interface circuit C1—functional circuit K801—CO lines CL101 and CL201. Consequently, the one digit content stored in the one digit memory circuit Y711 of the DTMF sending circuit SD1 is converted to a DTMF signal in the DTMF signal oscillating circuit Y71 and provided to the CO lines CL101 and CL201 through such circuit formed as above. Since this circuit formed is to be maintained only for about 100 m.sec., each DTMF signal is to be transmitted to the central office as a signal which is present only for about 100 m.sec. As the time of this 100 m.sec. elapses, the stored content in the one digit memory circuit Y711 of the DTMF sending circuit SDR1 is erased and the circuit SDR1 becomes idle. Such operation as has been described is repeated for the respective digits or signs, and the stored contents in the numerical value memory circuit NM of the main controlling circuit CC are all transmitted sequentially to the central office. In the central office, the well known operation will be performed to call the other required subscriber and the required talking will be made possible through the above referred CO line talking circuit.

ORIGINATING CALL TO CO LINE FOR MONITOR WITH SPEAKER

Reference shall now be made to the case of monitor requirement with the speaker when originating a call to a CO line from the key telephone KT1.

The handset of the key telephone KT1 is lifted to achieve the off-hook, the push button "CO" indicative of the CO line call requirement to the CO lines and the numerically numbered push buttons of, for example, "0" and "1" for selecting one CO line in the CO lines 1 to 16 are pressed and, in addition, a push button "SP" indicative of a monitor requirement with the speaker SP is pressed. An operation achieved due to the depressions of these push buttons "CO", "0" and "1" is exactly the same as that described in the foregoing and shall not be referred to here. Due to the depression of the push button "SP", the processor PRC of the main controlling circuit CC in the main equipment ME sends a monitor addressing signal for the CO line by the speaker to the lead wire FL501 through the address decoder DCR and flip-flop group F101, according to which the relay TB of the key telephone KT1 can be driven through the key telephone interface circuit L1, wiring cables EL501 and EL601, data transmitting and receiving circuit DTR101 and controlling circuit CTL. Therefore, between the key telephone KT1 and CO line, there is formed a circuit of the speaker SP of the key telephone KT1—speaker amplifier SPA—normally closed contact ltc of the relay LT—transformer T101—normally opened contacts tbo1 and tbo2 of the relay TB—wiring cables EL101 and EL201—transformer T61 of the key telephone interface circuit L1 of the main equipment ME—lead wire FL101—rows of the cross-point switch Y101 of switching matrix X1—columns of the cross-point switch Y101—lead wire XC1—CO line interface circuit C1—CO lines CL101 and CL201. Now, when the push buttons of the key telephone KT1 are pressed sequentially in accordance with such required number as, for example, "177", the processor PRC in the main controlling circuit CC of the main equipment ME converts the required number "177" into DTMF signals by the DTMF sending circuits SDR1 to SDR4 and sends these signals to the CO line CL101, as will be clear from the foregoing descriptions. In the central office, the other subscriber corresponding to the particular number "177" is caught. Provided the required number "177" is allotted, for example, to a local weather news service, such information as weather forecasts are available through the speaker SP, that is, in the key telephone KT1, the information can be monitored through the speaker SP. It will be clear that, when the monitoring through the speaker SP ends, a depression of a push button instructing the end of the monitoring (not shown) of the key pad KPD causes the initial state to be restored.

ELECTRIC POWER FEEDING TO THE KEY TELEPHONE FROM THE MAIN EQUIPMENT

The electric power feeding to the key telephone KT1 from the key telephone interface circuit L1 in the main equipment ME shall be referred to.

As will be clear in FIG. 2, the positive and negative poles of the direct current power source E62 of the key telephone interface circuit L1 are connected to the respective ends of the wiring cables EL601 and EL501 through the different windings of the choke CH61, the wiring cables EL601 and EL501 are connected respectively at the other ends to the input end of the power source circuit POW through different windings of the choke CH101, the capacitors C63 and C62 are inserted between the wiring cables EL601 and EL501 and the transformer T63, and the capacitors C102 and C101 are inserted between the wiring cables EL601 and EL501 and the transformer T102. Therefore, it will be clear that the electric power can be fed to the key telephone KT1 from the key telephone interface circuit L1 through the circuit of the positive pole of the direct current power source E62 of the key telephone interface circuit L1→one of the windings of the choke CH61→wiring cable EL601→one of the windings of the choke CH101 of the key telephone KT1→power source circuit POW→the other winding of the choke CH101→wiring cable EL501→the other winding of the choke CH601→negative pole of the direct current power source E62. Needless to say, the chokes CH61 and CH101 are provided with impedances large enough for the transmitted data signals between the transformers T63 and T102 and therefore will have no ill influence on the transmission of the data signals. It will be also clear that the electric power supply to the respective other key telephones KT2 to KT60 from each of the respective other key telephone interface circuits L2 to L60 are achieved exactly in the same manner as above.

TERMINATING CALLS FROM CO LINES

When an incoming call signal arrives the CO line interface circuit C1 from the central office through one of the 1 to 16 CO lines, for example, CL101 and CL201, the signal is transmitted, while not shown, to the main controlling circuit CC through the lead wire XE1, and the incoming call is transmitted to the respective key telephone interface circuits, wiring cables and key telephones through the lead wire which is idle in the lead wires FL501 and FL601 to FL560 and FL660. As the handset of, for example, the key telephone KT1 is lifted, a talking circuit of the office line interface circuit C1—switching matrix X1—lead wire FL101—key telephone interface circuit L1—wiring cables EL101 and EL201—normally closed contacts tbc1 and tbc2 of the relay TB—hybrid circuit NW—transmitter CMC and receiver RCV of the handset of the key telephone KT1 is formed and the talking becomes performable. The calling operation by the speaker SP in the key telephone KT1 is the same as in the case of the foregoing intercom call and its explanation shall be omitted here.

As has been referred to in the foregoing, according to the present invention, each of the plurality of key telephones is connected through the four wiring cables to each of the plurality of key telephone interface circuits in the main equipment, the four wiring cables are divided into two pairs so that a pair of the both-way voice frequency talking paths and a pair of the both-way digital data transmitting paths, or two pairs of the one-way voice frequency talking paths and a pair of both-way digital data transmitting paths, are formed and, in addition, the four switching matrixes are arranged within the main equipment so that a pair of the both-way voice frequency talking paths, or two pairs of the one-way voice frequency talking paths, and a pair of the both-way digital data transmitting paths are properly interconnected, and the electric power feeding path is formed as superposed on the pair of the both-way digital data transmitting paths. Therefore, the number of the wiring cables can be restricted to be minimum, an intercom incoming call on an off-hook telephone during handset talking can be indicated with a special tone signal, whereby the traffic density can be remarkably increased and such recent demand can be met without increasing costs.

Still according to the present invention, the four switching matrixes which are small in size are arranged within the main equipment, so that the respective operations corresponding to the respective functions can be properly divided so as to render an employment of a plurality of small size and inexpensive switching matrixes possible, whereby, as compared with an event in which a small number of large switching matrixes are employed, the manufacturing costs can be maintained lower while the functions of the key telephone system still can be well expanded.

Further according to the present invention, it is not necessary to arrange the DTMF sending circuit in each of the plurality of key telephones but it is only necessary to provide a few DTMF sending circuits in the main equipment, so that the key telephone can be manufactured more economically and smaller in size. In addition, as the outgoing call to the CO lines from each of the key telephones is sent out through the main controlling circuit, such novel service functions as the restriction of toll calls, the last number redial and the like can be well achieved economically.

What is claimed is:

1. In a key telephone system comprising a main equipment connected to a plurality of central office lines and a plurality of key telephones connected to said main equipment, an arrangement in which said main equipment comprises
    (a) a central-office-line interface circuit connected to said central office lines, (b) a key-telephone interface circuit connected to each of said plurality of key telephones, (c) a first switching matrix including columns, at least some of which are connected to said central-office-line interface circuit and others of which are connected to an intercom trunk circuit, and rows connected to respective said key-telephone interface circuits, (d) a second switching matrix including columns connected to said central-office-line interface circuit, and rows connected to a dual-tone multifrequency sending circuit, '(e) a third switching matrix including rows connected to said columns of the first switching matrix which are connected to said intercom trunk circuit and columns connected to a tone source, (f) a fourth switching matrix including columns connected to said intercom trunk circuit and tone source and rows connected to said key-telephone interface circuits, and (g) a main controlling means connected to the key-telephone interface circuit and duel-tone multifrequency sending circuit and to respective control leads of the first, second, third and fourth switching matrixes for controlling said switching matrixes to perform selected cross-point switching in response to a call request signal.

2. The system according to claim 1 wherein said intercom trunk circuit includes a two-wire-to-four-wire converting circuit which divides a both-way voice frequency talking path formed through said first switching matrix into a pair of one-way and mutually reverse directional voice frequency talking paths, and said fourth switching matrix comprises a four-wire switching circuit.

3. The system according to claim 1 wherein said main equipment and respective said key telephones are mutually connected through a first pair of wiring cables connected through said key-telephone interface circuit to said first switching matrix and forming a both-way voice frequency talking path and to said fourth switching matrix to form a first one-way voice frequency talking path and a part of second one-way voice frequency talking path, and a second pair of wiring cables connected through the key-telephone interface circuit to said main controlling means and forming a both-way digital data transmitting path and an electric power feeding path, and also through the key-telephone interface circuit to said fourth switching matrix and forming a part of said second one-way voice frequency talking path.

4. The system according to claim 3 wherein said dual-tone multifrequency sending circuit includes a dual-tone signal oscillating circuit connected to said rows of said second switching matrix and a one-digit memory circuit inserted between said dual-tone multifrequency signal oscillating circuit and said main controlling means, said key-telephone interface circuit includes a data transmitting and receiving circuit between the main controlling means and wiring cables forming said both-way digital data transmitting circuit, and
said key telephones include respectively a second data transmitting and receiving circuit connected to the wiring cables forming said both-way digital data transmitting path, a scanning circuit connected to said second data transmitting and receiving circuit, a push button pad to be scanned by said scanning circuit, a controlling circuit connected to said second data transmitting and receiving circuit and providing a command to the scanning circuit for scanning said push button pad, a data memory circuit for temporarily storing a scanning result of the scanning circuit and providing thus stored results sequentially to the second pair of wiring cables in response to driving pulses from said main equipment, and a relay connected to said controlling circuit and switching the both-way voice frequency talking path over to the one-way voice frequency talking path in response to said command from the controlling circuit.

5. The system according to claim 4 wherein said main equipment is provided with a plurality of dual-tone multifrequency sending circuits and said main controlling means is provided with a numerical value memory circuit for temporarily storing digital data transmitted from one of said key telephones through said data transmitting and receiving circuit in said key-telephone interface circuit, said main controlling means sequentially providing each digit of the stored contents of said numerical value memory circuit in the stored order to an idle one of said dual-tone multifrequency sending circuits.

6. The system according to claim 5 wherein said central-office-line interface circuit includes a parallel circuit of a relay contact and resistance inserted between a junction point of the central-office-line interface circuit with said first switching matrix and a junction point of the central-office-line interface circuit with said second switching matrix, and a relay connected to said main controlling means for opening said relay contact upon each arrival of a single digit dual-tone multifrequency signal through the second switching matrix, said single digit dual-tone multifrequency signal being transmitted to one of said key telephones through the first switching matrix and key telephone interface circuit as attenuated by said resistance.

* * * * *